Figure 1:
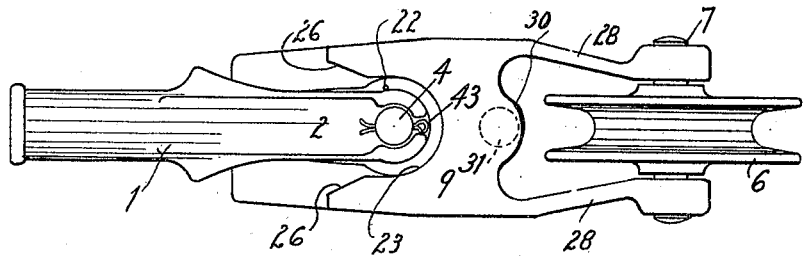

W. F. FREEMAN.
TROLLEY HARP EXTENSION.
APPLICATION FILED MAR. 5, 1921.

1,383,796.

Patented July 5, 1921.
2 SHEETS—SHEET 1.

Walter F. Freeman, INVENTOR.

BY

Frank A. Cutter, ATTORNEY.

W. F. FREEMAN.
TROLLEY HARP EXTENSION.
APPLICATION FILED MAR. 5, 1921.

1,383,796.

Patented July 5, 1921.
2 SHEETS—SHEET 2.

INVENTOR.
Walter F. Freeman,
BY
Frank A. Cutter,
ATTORNEY.

UNITED STATES PATENT OFFICE.

WALTER F. FREEMAN, OF SPRINGFIELD, MASSACHUSETTS.

TROLLEY-HARP EXTENSION.

1,383,796.　　　　　Specification of Letters Patent.　　Patented July 5, 1921.

Application filed March 5, 1921. Serial No. 449,681.

*To all whom it may concern:*

Be it known that I, WALTER F. FREEMAN, a citizen of the United States of America, and a resident of Springfield, in the county of Hampden and State of Massachusetts, have invented a new and useful Trolley-Harp Extension, of which the following is a specification.

My invention relates to improvements in the so-called harps with which the upper ends of trolley poles are provided, and consists essentially of a supplementary or auxiliary member or element, which is pivotally connected with the ordinary trolley-pole harp, after the latter has been rearranged on its pole so that the axle is positioned in an approximately vertical instead of a horizontal plane, and carries the trolley wheel or follower, such element comprising certain peculiar oscillatory and yielding or resilient means, whereby said wheel or follower is held against the overhead wire, and which actually forms a cushion support for the wheel or follower, and a support that is capable of oscillatory movement laterally, these movements all being independent of the movements of the harp, together with such other parts and members as may be needed or desired in order to render the device practicable and efficient in every respect, all as hereinafter set forth.

The present attachment is designed to be mounted to oscillate on the harp axle, which must be located at right-angles to the position that such axle ordinarily occupies, while the trolley wheel or follower, whichever may be used, is mounted on a horizontal axle journaled in the fork at the rear end of said attachment.

It is customary to mount the trolley wheel or follower in a harp that is rigidly attached at the upper end of a trolley pole, which pole is caused to assume the approximately erect or upright position by means of powerful springs, so that said wheel or follower is held against the overhead wire with a great amount of pressure, with the result that the wheel or follower and its bearing parts are quickly worn out to an extent that renders them useless. There is, therefore, lacking the proper amount of flexibility to insure the contact of the wheel or follower with the wire at all times, without unduly or quickly wearing out the wheel or follower and its bearing parts. There is also lacking the required flexibility to enable the wheel or follower to adapt itself quickly enough to meet the conditions arising from the jolting of the car over a rough road bed, or form an uneven and deflected overhead wire, or to adjust itself quickly enough to meet such conditions, with the result that the wheel or follower is frequently caused to leave the wire and the supporting wires are damaged by said pole. Furthermore, the wheel or follower is so held or supported that it binds or pinches the overhead wire, in rounding a curve, and so causes both said wheel or follower and wire to be greatly worn and said wire consequently to be weakened. The primary object of my invention, therefore, is to provide a comparatively simple and inexpensive trolley mount or harp extension, which can be attached to the ordinary harp by removing the wheel and mounting the extension on the axle of said harp, after the position of said harp has been changed as hereinbefore noted, whereby the desired flexibility and sensitiveness of the trolley wheel or follower and supporting parts are obtained, and the above-noted objections removed or eliminated.

With my new construction the pressure of the trolley wheel or follower against the overhead wire is greatly reduced, inasmuch as said wheel or follower is carried on a comparatively sensitive cushion which affords both up and down and lateral movement, and said wheel or follower is capable of quickly adapting itself to unevenness in said wire in any direction, and to the jolting of the car, and the liability of said wheel or follower to leave the wire is reduced to the minimum.

A further advantage of my invention is found in the fact that provision is made for normally keeping the wheel or shoe in line with the pole; such provision, however, is of a yielding nature, as already clearly indicated. The lateral motion of which my device is capable, therefore, insures a good contact between the wheel or follower and the wire in rounding a curve. Wear on both wheel or follower and overhead wire is greatly lessened, and the damage to supporting wires resulting when said wheel or follower leaves said overhead wire is reduced to the minimum.

Another object is to produce a device of this character that is not only simple in construction and operation, and comparatively inexpensive, but is adapted to be connected with, attached to, or mounted on or in the ordinary trolley harp, and to carry the ordinary trolley wheel or follower.

Other objects and advantages will appear in the course of the following description.

I attain the objects and secure the advantages of my invention by the means illustrated in the accompanying drawings, in which—

Figure 2:
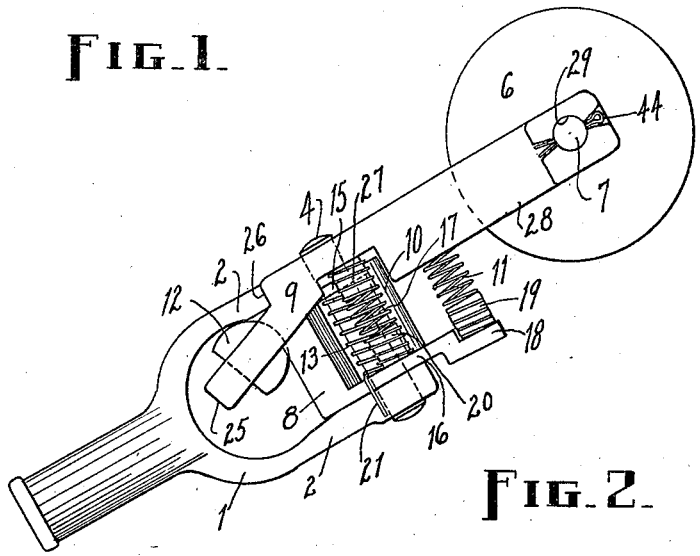
Figure 3:
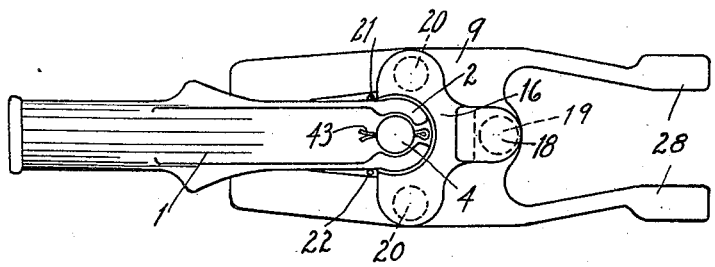
Figure 4:
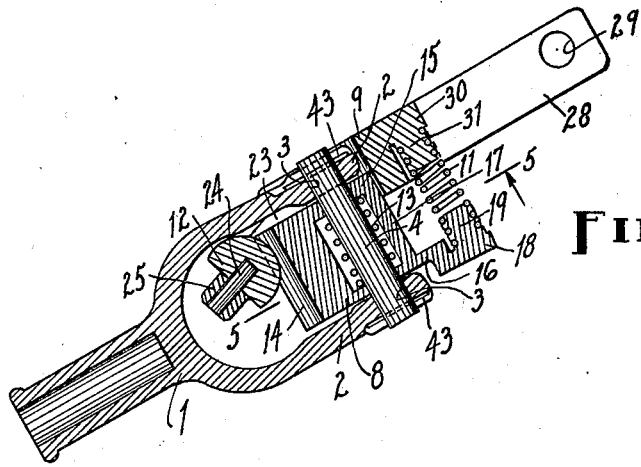
Figure 5:
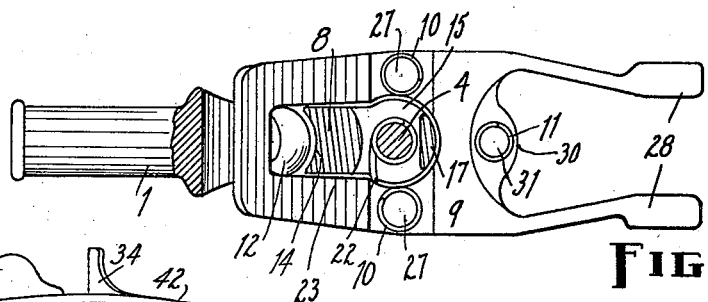
Figure 6:
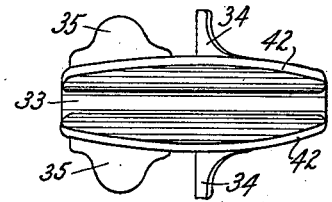
Figure 9:
Figure 7:
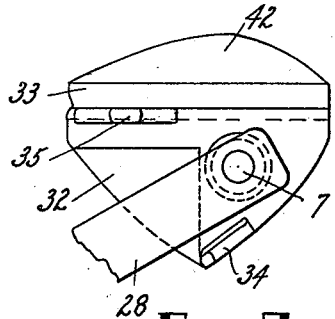
Figure 8:
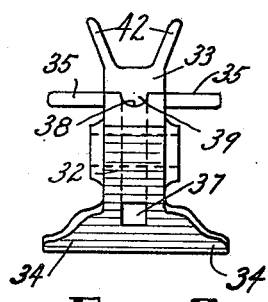
Figure 10:
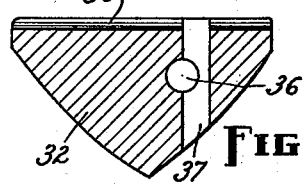

Figure 1 is a top plan of a trolley-harp extension which embodies a practical form of my invention, such extension being connected with an ordinary trolley-pole harp; Fig. 2, a side elevation of said harp and extension, showing the same in approximately the position which they would occupy if the trolley wheel were about to be permitted to contact with an overhead wire; Fig. 3, a bottom plan of the harp and extension; Fig. 4, a central, longitudinal section through the harp and extension, the same being positioned obliquely as in Fig. 2; Fig. 5, a longitudinal section through the harp and extension, taken on lines 5—5, looking in the direction of the associated arrow, in Fig. 4; Fig. 6, a top plan of a follower, which may serve either in the capacity of a shoe or as an ice-scraper, and may be substituted in the extension for the trolley wheel; Fig. 7, a side elevation of said follower and a fragment of one of the arms of the fork which affords a bearing for the same and is a part of the extension; Fig. 8, a rear elevation of the follower; Fig. 9, a side elevation of the wearing member of the follower, and, Fig. 10, a sectional view of the permanent part of body of the follower, into which and with which said wearing part is adapted to fit and be securely connected, and from which it may be disconnected and removed.

The trolley-wheel is shown only in the first two views.

Similar reference characters designate similar parts throughout the several views.

In the drawings I show at 1 a trolley-pole harp, of ordinary construction, but arranged so that the arms 2 of its fork are in a vertical plane, instead of a horizontal plane as heretofore. At the outer ends of the arms 2 are bearings 3—3 for an axle 4. A trolley wheel, such as 6, is usually mounted on the axle 4, when the harp 1 is positioned and used in the ordinary manner, but in the present device such wheel is or may be mounted on another axle, as 7, as will presently be more fully explained.

The supplementary attachment or extension comprises a carrier 8 which is mounted on the axle 4, and a rocker 9, that might be termed a supplementary, secondary, or auxiliary harp, which is supported from said carrier by two forward springs 10 and a rear spring 11, said rocker being provided with a bearing 12 for engagement with the upper arm 2, when said rocker is depressed at its rear terminal, a centering spring 13 being provided normally to retain the carrier with its central, longitudinal, vertical plane in line or coinciding with the corresponding plane of the harp 1, or in the intermediate position.

The carrier 8 is receivable between the harp arms 2, and has in its front end a longitudinal groove 14 which is concave in cross section, and upper and lower, rearwardly-extending arms 15 and 16, respectively, through which the axle 4 passes, and which form the bearings for the carrier on said axle. The arms 15 and 16 are connected behind the axle 4 with an upright 17, and said arm 16 has a rearwardly-extending, stepped projection or lip 18. The lip 18 is at the rear end of the arm 16, and rising from this projection is a post 19 which is exteriorly screw-threaded. The arm 16 also has lateral projections from which rise posts 20—20. The plane common to the axes of the posts 20 is a little behind the plane of the axle 4 which last-named plane is parallel with said first-named plane.

The carrier 8 is normally retained with its central, longitudinal, vertical plane in line or coinciding with the central, longitudinal, vertical plane of the yoke 1, by the spring 13, one terminal of which spring is carried outwardly and downwardly past the contiguous edges of the arm 16 and the lower arm 2, and the other terminal of which spring is carried outwardly and upwardly past the contiguous edges of the arm 15 and the upper arm 2, as represented at 21 in the first instance and 22 in the second instance. Thus the opposite terminals of the spring 13 normally bear on opposite sides or edges of the upper and lower arms 2 and of the upper and lower arms 15 and 16, respectively, so that they have a tendency to retain the carrier 8 in the normal, intermediate position hereinbefore described, and to return said carrier to said position. Force, exerted on the carrier 8 to actuate the same on the axle 4 to the right, causes the arm 15 to contract and tighten the spring 13, by reason of the contact which exists between said arm and the spring terminal 21, and due to the further fact that the spring terminal 22 is in contact with the bottom arm 2, so that a greater tension is put on said spring, and this operates to return said carrier to normal position, as soon as the same is again released. Similarly, force exerted to actuate the carrier 8 in the opposite direction or to the left, causes the arm 16 to contract and tighten the spring 13, by reason of the contact existing between said arm and the spring terminal 22, and due, further, to the engagement of the spring terminal 21 with the upper arm 2, so that, as before, a greater tension is put on said spring, and this operates, upon the release of said carrier, to restore the carrier to normal position.

The rocker 9 has an opening 23 therein to receive the rear terminal portion of the upper arm 2 and the upper part of the forward terminal portion of the carrier 8. The opening 23 is of sufficient size generally to enable the rocker 9 to move quite freely without obstruction or interference on the part of the upper harp arm 2, and of sufficient width specifically to receive the forward portion of the carrier 8 and permit the forward terminal of the rocker to move up and down relative thereto. The bearing 12 also is located in the opening 23, between the front end of said opening and the forward terminal of the carrier 8. This bearing is approximately hemispherical, and arranged with its flattened side contiguous to the inner face of the front end of the opening 23 in the rocker 9. The bearing 12 is mounted to rotate on a stud 24 set in the front end, which end is indicated by the numeral 25, of the rocker 9. Thus said bearing is of the anti-friction type, the office or purpose of which will presently be fully explained. The upper parts of the forward terminal portions of the rocker 9 are cut away, as best shown at 26—26 in Fig. 1, to permit said rocker to swing, on and with the carrier 8, through a longer arc without contact with the upper arm 2 than would otherwise be possible.

Depending from the rocker 9 are two posts 27 which are approximately in line with the posts 20 below when the parts are assembled, and the springs 10 at their upper and lower terminals encircle said posts 27 and 20, respectively. The rear terminal of the rocker 9 is in the form of a fork the arms of which are represented at 28—28, and these arms form bearings, as at 29, for the axle 7. Depending from a lug or lip 30 in the crotch of the rocker fork is a post 31. The post 31 is approximately in line with the post 19 below when the parts are assembled, and said first-named post is externally screw-threaded like said second-named post. The spring 11 has its terminals screwed on to the posts 19 and 31.

The rocker 9 is yieldingly supported as on a cushion by the springs 10 and 11, so that it can rock or tilt quite freely. Due to the fact that the rocker 9 partially embraces the carrier 8, (and incidentally it may be noted that the anti-friction bearing 12 is always in engagement with the grooved part 14 of said carrier), said rocker moves or oscillates laterally on and with said carrier and with the axle 4 as the pivotal center, and this regardless of the position of the rocker longitudinally, that its to say, of the tilted position of the rocker, such oscillatory movement being transmitted from the rocker to the carrier. The upward movement of the forward terminal of the rocker 9 is limited by the bearing 12 which then comes into contact with the under side of the upper harp arm 2, and said bearing rolls beneath said arm when said rocker with the carrier 8 is oscillated on the axle 4. The downward movement of the rear terminal of the rocker 9 is limited only by the maximum compression of the springs 10 and 11. The upward movement of the rear terminal of the rocker 9 is limited by the contact of the bearing 12 with the forward, grooved terminal of the carrier 8, and such movement is subject more or less to the restraint afforded by the spring 11, due to the fact that said spring at its terminals is in screw-threaded engagement with the posts 19 and 31. The combined strength of the springs 10 being greater than that of the spring 11, the rocker 9 is normally retained with the bearing 12 in contact with the upper arm 2, and said rocker fulcrums, through the medium of said bearing, on said arm, when the rear terminal of the rocker is depressed. And, when the rocker is tilted upwardly at the rear terminal, said rocker fulcrums on the springs 10. Any marked tendency of the rocker to move forwardly, without the harp 1, is checked by the rear terminal of the upper arm 2, and any marked tendency of the rocker to move rearwardly, independently, is checked by the carrier 8 into contact with which the bearing 12 is then brought. There is necessarily a comparatively slight amount of longitudinal play permitted the rocker, but only such amount as is necessary to permit the rocker to be thrown up at the rear end and down at the forward end. At this time the bearing 12 is drawn away from the upper arm 2.

It is now seen that a very flexible support is afforded for the trolley wheel 6, and that said wheel is permitted to follow without difficulty whatever undulations there may be in the overhead wire.

In practice, when the trolley wheel 6 is brought into contact with the overhead wire, the springs 10 and 11 are contracted to some extent, owing to the superior force exerted by the trolley-pole springs. The wheel 6 is free to revolve beneath the overhead wire, and may move up and down, subject to the control of the springs 10 and 11, but with comparative freedom, the rocker 9 then fulcruming, through the medium of the bearing 12, on the upper arm 2, and to follow any lateral divergencies in said wire, said rocker then swinging with the carrier 8 on the axle 4. More or less lateral movement of the parts also takes place when the wheel 6 follows the overhead wire around a corner. Thus the support for the wheel 6 is very flexible, and affords the necessary freedom of movement to said wheel, other than the rotary motion thereof, and in no way interferes with such motion, but rather improves the same or renders it more free.

In the event it be desired to substitute a shoe or to employ an ice-scraper, it is simply necessary to remove the wheel 6 and insert in place thereof on the axle 7 such shoe or scraper.

The device which I have illustrated in the last five views, and have termed a follower, may be used in the capacity of either a shoe or an ice-scraper. This follower comprises a body 32 and a removable shoe 33. The shoe 33 may serve as an ice-scraper and either is to be comprehended or understood by the term shoe.

The body 32 has a generally triangular superficial outline, is provided at the bottom with a pair of laterally extending lugs 34, and at the top with another pair of laterally extending lugs 35, and has a transverse opening or bore 36 therethrough to receive the axle 7, a vertical slot 37 therethrough, and a horizontal groove 38 therein. The bore 36 is back of the transverse center of the body 32, and the rear half of said opening communicates with the forward portion of the slot 37 intermediate of the ends of said slot. The lugs 34 are on and behind the longitudinal center of the body 32, while the lugs 35 are forward of said center. The groove 38 is in the longitudinal center of the top of the body 32. The body 32 is of a thickness which enables it, like the wheel 6, to be received between the arms 28.

The shoe 33 has on the bottom a rib 39 to fit into the groove 38 to assist in properly locating said shoe on the body 3, and preventing the former from moving or twisting laterally on the latter; and said shoe also has on the bottom a downwardly extending tongue 40 which is receivable in the slot 37, and which has a semi-circular slot 41 in the front edge thereof that has the same radius as that of the bore 36, and coincides with the corresponding portions of said bore, when said tongue is completely in said first-named slot. The shoe 33 is provided on top with a pair of wings 42, as is customary.

When the shoe 33 is placed in position on the body 32, the latter is introduced between the fork arms 28 of the rocker 9, with each of said arms extending downwardly and forwardly between the lugs 34 and 35 on the corresponding side of said body, and the axle 7 is thrust through the bearings 29 and the bore 36 and slot 41. The tongue 40 is now locked in place in the slot 37 by the axle 7, and the body 32 is mounted in position for use. The lugs 35, being below the arms 28, limit the amount of movement which it is possible for the follower to have on the axle 7 in one direction, and the lugs 35, being above said arms, limit the amount of movement of said follower on said axle in the other direction. The lugs 35 in the present example are at the top of the body 32 and parallel with said top.

The follower is, of course, supported and carried by the extension in substantially the same manner as is the wheel 6.

By constructing the follower in two parts I am able to remove and replace the shoe 33, or substitute another therefor, with the utmost facility, so that a great saving is effected, as will be readily understood.

It has not been deemed necessary to show in the drawings either the trolley pole springs or the overhead wire to which reference has been made, inasmuch as they are so old and well known.

Cotter-pins 43 and 44, respectively, may be employed to retain the axle 4 in place in the bearings 3 and the axle 7 in place in the bearings 29.

More or less change in the size, shape, construction, and arrangement of some or all of the parts of this invention may be made, without departing from the nature thereof or exceeding the scope of what is claimed.

The spring 11, having a screw-thread attachment with the pins 19 and 31, tends to prevent a too sudden rise of the rear terminal of the rocker 9 and the shock or jar that in that event would result when the bearing 12 contacted with the grooved part 14. Thus noise is eliminated and wear and tear are decreased.

The term axle as herein employed is intended to include and cover any axial or pivotal connection between the harp and extension, and between the extension and wheel or follower.

What I claim as my invention, and desire to secure by Letters Patent, is—

1. The combination, in a trolley harp extension, with a trolley-pole harp and its axle, the latter being in an approximately vertical plane, of non-pivotal rocking means mounted indirectly on said axle and adapted to carry a trolley wheel.

2. The combination, in a trolley harp extension, with a trolley-pole harp and its axle, the latter being in an approximately vertical plane, of oscillatory means mounted directly on said axle, and non-pivotal rocking means mounted on said first-named means, and adapted to carry a trolley wheel.

3. The combination, in a trolley harp extension, with a trolley-pole harp and its axle, the latter being in an approximately vertical plane, of spring-actuated oscillatory means mounted directly on said axle, and non-pivotal rocking means mounted on said first-named means, and adapted to carry a trolley wheel.

4. The combination, in a trolley harp extension, with a trolley-pole harp and its axle, the latter being in an approximately vertical plane, of oscillatory means mounted on said axle, and spring-supported rocking means mounted on said first-named means, and adapted to carry a trolley wheel.

5. The combination, in a trolley harp extension, with a trolley-pole harp and its axle, the latter being in an approximately vertical plane, of spring-actuated oscillatory means mounted on said axle, and spring-supported rocking means mounted on said first-named means, and adapted to carry a trolley wheel.

6. The combination, in a trolley harp extension, with a trolley-pole harp and its axle, the latter being in an approximately vertical plane, of a member mounted to oscillate on said axle, and a trolley-wheel-carrying member spring-supported from and adapted to rock on said first-named member, and to engage the same for oscillatory movement.

7. The combination, in a trolley harp extension, with a trolley-pole harp and its axle, the latter being in an approximately vertical plane, of a member mounted to oscillate on said axle, a spring arranged normally to retain said member in its intermediate position, and a trolley-wheel-carrying member mounted to rock on said first-named member, and to engage the same for oscillatory movement.

8. The combination, in a trolley harp extension, with a trolley-pole harp and its axle, the latter being in an approximately vertical plane, of a member mounted to oscillate on said axle, a trolley-wheel-carrying member in engagement with said first-named member for oscillatory movement, and springs to support said second-named member from said first-named member.

9. The combination, in a trolley harp extension, with a trolley-pole harp and its axle, the latter being in an approximately vertical plane, of a member mounted to oscillate on said axle, a spring arranged normally to retain said member in its intermediate position, a trolley-wheel-carrying member in engagement with said first-named member for oscillatory movement, and springs to support said second-named member from said first-named member.

10. The combination, in a trolley harp extension, with a trolley-pole harp and its axle, the latter being in an approximately vertical plane, of a member mounted to oscillate on said axle, and a trolley-wheel-carrying member mounted to rock on said first-named member, and in engagement therewith for oscillatory movement, said second-named member being provided with a bearing to contact with said harp.

11. The combination, in a trolley harp extension, with a trolley-pole harp and its axle, the latter being in an approximately vertical plane, of a member mounted to oscillate on said axle, a trolley-wheel-carrying member in engagement with said first-named member for oscillatory movement, and springs to support said second-named member from said first-named member, and said second-named member being provided with a bearing to contact with said harp.

12. The combination, in a trolley harp extension, with a trolley-pole harp and its axle, the latter being in an approximately vertical plane, of a member mounted to oscillate on said axle, a trolley-wheel-carrying member in engagement with said first-named member for oscillatory movement, and mounted to rock thereon, said second-named member being provided with a bearing adapted to contact with said harp and with the forward terminal of said first-named member, according to the tilted position of said second-named member.

13. The combination, in a trolley harp extension, with a trolley-pole harp and its axle, the latter being in an approximately vertical plane, of a member mounted to oscillate on said axle, a trolley-wheel-carrying member in engagement with said first-named member for oscillatory movement, and springs to support said second-named member from said first-named member, said second-named member being provided with a bearing adapted to contact with said harp and with the forward terminal of said first-named member, according to the position of said second-named member on its springs.

14. The combination, in a trolley harp extension, with a trolley-pole harp and its axle, the latter being in an approximately vertical plane, of a member mounted to oscillate on said axle, means normally to retain said member in an intermediate position, and a trolley-wheel-carrying member in engagement with said first-named member for oscillatory movement, and mounted to rock thereon, said second-named member being provided with a bearing to contact with said harp.

15. The combination, in a trolley harp extension, with a trolley-pole harp and its axle, the latter being in an approximately vertical plane, of a member mounted to oscillate on said axle, means normally to retain said member in an intermediate position, and a trolley-wheel-carrying member in engagement with said first-named member for oscillatory movement, and mounted to rock thereon, said second-named member being provided with a bearing adapted to contact with said harp and with the forward terminal of said first-named member, according to the tilted position of said second-named member.

16. The combination, in a trolley harp extension, with a trolley-pole harp and its axle, the latter being in an approximately vertical plane, of a member mounted to oscillate on said axle, and a trolley-wheel-carrying member in engagement with said first-named member for oscillatory movement, and mounted to rock thereon, said second-named member being provided with an anti-friction bearing adapted to contact with said harp.

17. The combination, in a trolley harp extension, with a trolley-pole harp and its axle, the latter being in an approximately vertical plane, of a member mounted to oscillate on said axle, a trolley-wheel-carrying member in engagement with said first-named member for oscillatory movement, and springs to support said second-named member from said first-named member, said second-named member being provided with an anti-friction bearing adapted to contact with said harp.

18. The combination, in a trolley harp extension, with a trolley-pole harp and its axle, the latter being in an approximately vertical plane, of a carrier mounted on said axle, and provided with posts, a trolley-wheel-carrying rocker in engagement with said carrier for oscillatory movement, and also provided with posts, and springs mounted on said posts to support said rocker from said carrier.

19. The combination, in a trolley harp extension, with a trolley-pole harp and its axle, the latter being in an approximately vertical plane, of a carrier mounted on said axle and provided with posts, a trolley-wheel-carrying rocker in engagement with said carrier for oscillatory movement, and also provided with posts, and springs mounted on said posts and adapted to support said rocker from said carrier, one of said springs having its terminals fixedly attached to two of said posts.

20. The combination, in a trolley harp extension, with a trolley-pole harp and its axle, the latter being in an approximately vertical plane, of a grooved carrier mounted on said axle, and provided with posts, a trolley-wheel-carrying rocker in engagement with said carrier for oscillatory movement and also provided with posts, and further provided with a bearing to engage said harp and the grooved part of said carrier, and springs on said posts arranged to support said rocker from said carrier, according to the position of said rocker on its springs.

21. The combination, in a trolley harp extension, with a trolley-pole harp and its axle, the latter being in an approximately vertical plane, of a grooved carrier mounted on said axle, and provided with posts, a spring arranged normally to retain said carrier in its intermediate position, a trolley-wheel-carrying rocker also provided with posts, and springs on said posts to support said rocker from said carrier, said rocker being further provided with means laterally to engage the carrier.

22. The combination, in a trolley harp extension, with a trolley-pole harp and its axle, the latter being in an approximately vertical plane, of a carrier mounted on said axle, and grooved in the front end, a tilting trolley-wheel-carrying rocker, the forward portion of said rocker being arranged to engage the sides of the forward portion of said carrier, and provided with a bearing to engage said harp and the grooved portion of said carrier, according to the tilted position of said rocker, and springs to support said rocker from said carrier.

WALTER F. FREEMAN.

Witnesses:
F. A. CUTTER,
C. D. MONROE.